No. 672,797. Patented Apr. 23, 1901.
T. L. McCORMACK.
BOUTONNIÈRE.
(Application filed Feb. 20, 1901.)
(No Model.)
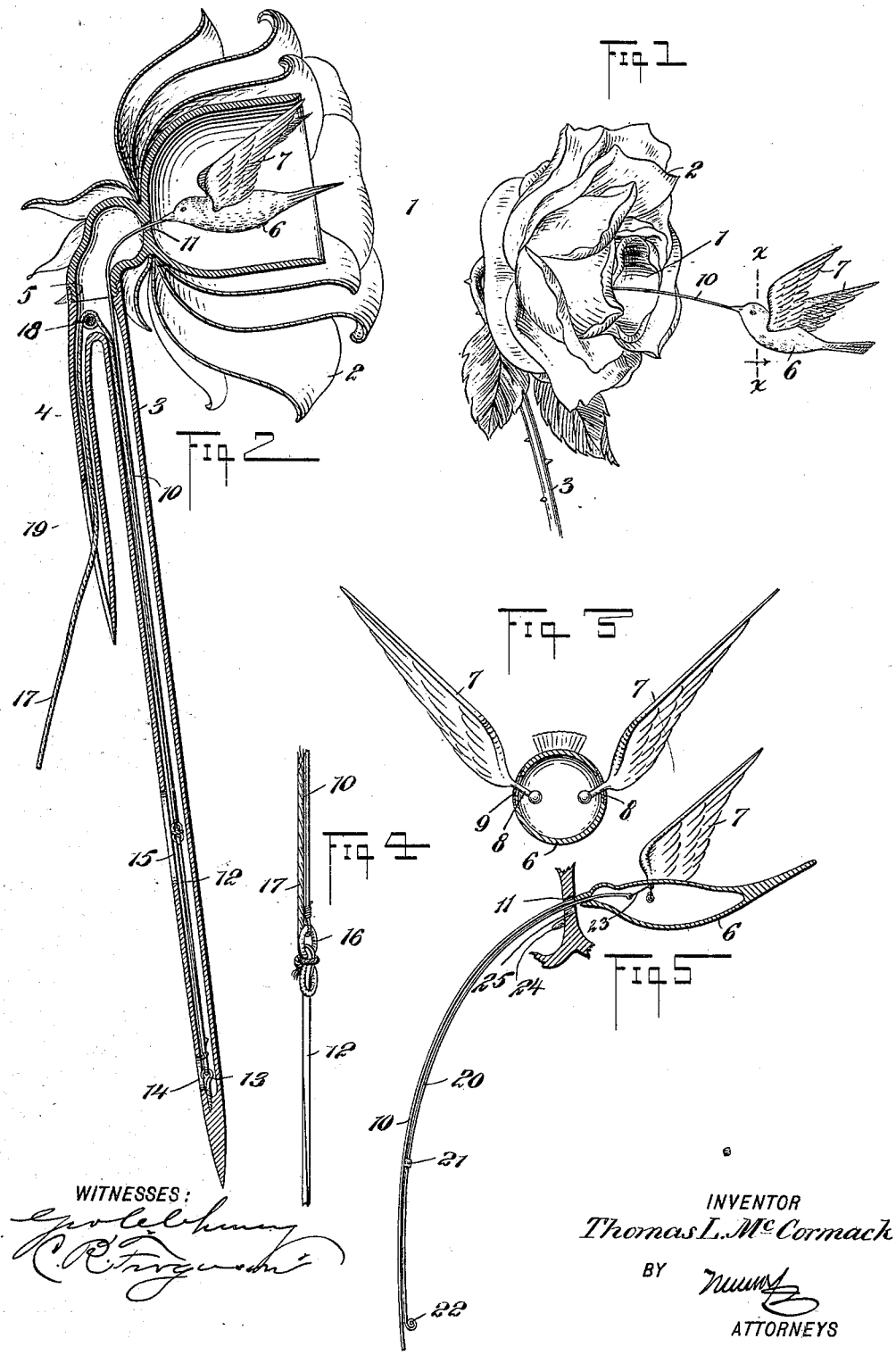
WITNESSES:
INVENTOR
Thomas L. McCormack
BY
ATTORNEYS

UNITED STATES PATENT OFFICE.

THOMAS LEANDER McCORMACK, OF DANVILLE, ARKANSAS.

BOUTONNIÈRE.

SPECIFICATION forming part of Letters Patent No. 672,797, dated April 23, 1901.

Application filed February 20, 1901. Serial No. 48,078. (No model.)

*To all whom it may concern:*

Be it known that I, THOMAS LEANDER MC-CORMACK, a citizen of the United States, and a resident of Danville, in the county of Yell and State of Arkansas, have invented a new and Improved Boutonnière, of which the following is a full, clear, and exact description.

This invention relates to improvements in artificial boutonnières; and the object is to provide a device of this character designed to be worn upon a person's coat or other clothing and having a device simulating a bird or other object movable in and out relatively to the flower, the said device being under the control of the wearer.

I will describe a boutonnière embodying my invention and then point out the novel features in the appended claims.

Reference is to be had to the accompanying drawings, forming a part of this specification, in which similar characters of reference indicate corresponding parts in all the figures.

Figure 1 is a perspective view of a boutonnière embodying my invention. Fig. 2 is a sectional view thereof. Fig. 3 is a section on the line $x\,x$ of Fig. 1. Fig. 4 is a detail view showing a manner of securing certain parts together, and Fig. 5 is a sectional view showing a modification.

Referring to the drawings, 1 designates the body portion of the flower, here shown as cup or bowl shaped, and mounted on this body portion are leaves 2, representing a rose or other flower. These leaves may be made of any suitable material—such, for instance, as celluloid, paper, or a woven fabric. The body portion is detachably connected to tubular stems 3 and 4. The stem portion 3 is considerably longer than the stem portion 4, and the said stems communicate one with the other. I have here shown the body portion as having a screw-thread engagement 5 with the stems.

The device 6, movable into and out of the body portion, is here represented as a humming-bird, the body of which is hollow, and the wings 7 are designed to have a slight fluttering movement relatively to the body. To provide for this, the wings have shank portions 8, which extend through flexible strips 9, of rubber or the like, attached to the body portion, and the inner ends of these shanks are provided with enlargements to prevent them from being forced or drawn outward. The long bill of the bird is formed by a wire 10, of steel or other flexible material, which passes through an opening 11 in the base of the body portion and extends downward into the long stem 3, and connected to the lower end of this wire 10 is an elastic 12, which is secured at its lower end to an eye 13 at the lower end of the stem 3. To permit of the elastic being readily attached to the eye should it be broken, I provide the stem opposite said eye with an opening 14, and to permit of readily attaching the elastic to the bill or wire 10 the stem is also provided with an opening 15. The wire 10 and the elastic 12 are connected one with the other, as here shown, by means of a double ring 16, and connecting with this ring 16 is an operating-cord 17, which passes upward through the stem 3, over a roller 18, and thence downward through the short stem 4. This short stem 4 is provided at one side with an opening 19, so that the end of the cord may be folded into the short stem when not in use and readily grasped to withdraw it when the device is in use.

In Fig. 5 I have shown a means for causing the wings of the bird to move up and down or flutter as the bird moves outward or inward. This means consists of a flexible wire 20, which extends along the wire 10 and passes loosely through a loop 21 on said wire 10, and at the lower end the wire 20 is provided with a coil 22, adapted to engage a lug 24 to prevent its being drawn through the opening 11 when the bird moves outward, and the opening 11 has a depression 25 to permit the passing of the loop 21. The wire 20 extends into the body of the bird and has flexible connections 23 with the shank portions 8 of the wings.

In operation the device may be attached to the outer side of a coat or other garment, or it may be held in place by inserting the stem 3 into the garment, the lower end of said stem being pointed to facilitate the insertion. In this case the short stem 4 may be forced through the garment, so that the draw-string 17 will extend downward at the inner side of the garment. The bird will normally rest in the body portion 1; but upon drawing downward on the string 17 the wire 10 will be forced upward, consequently moving the bird outward or out of the body portion, as indicated in Fig. 1. Upon releasing the string, the elastic 12 will immediately draw the bird back into the position indicated in Fig. 2.

Having thus described my invention, I claim as new, and desire to secure by Letters Patent—

1. A boutonnière, comprising a hollow body portion, a tubular stem extended therefrom, a device movable into and out of the body portion, a flexible wire extended from said device into the tubular stem, a flexible connection between said wire and the stem, and a draw-string connecting with said wire, substantially as specified.

2. A boutonnière, having a hollow body portion, a device movable into and out of said body portion, wings mounted to move on said device, a flexible wire extended from said device, a tubular stem connecting with the body portion and into which said wire extends, an elastic connection between said wire and the stem, and a draw-cord connecting with said wire and extended outward through the stem, substantially as specified.

3. A boutonnière, comprising a hollow body portion, two tubular stems connecting with said body portion, one being longer than the other, a bird or the like, a flexible wire extended from said bird or the like through an opening in the base of the body portion and into the longer stem, an elastic connection between the lower end of said wire and the lower portion of the said longer stem, and a cord extended from the lower end of said wire upward through the longer stem and thence downward through the shorter stem, substantially as specified.

4. A boutonnière, comprising a hollow body portion, a bird movable into and out of said body portion, the said bird having a hollow body, wings for the bird, flexible devices attached to the body portion, and shanks on the wings extending through said flexible devices, substantially as specified.

5. A boutonnière, comprising a body portion, two stems having removable connection with the body portion, the said stems being tubular and of different lengths, a device movable into and out of the body portion, a flexible wire forming a bill for said device and extended into the longer stem, an elastic connection between the lower end of said wire and the lower portion of the longer stem, a draw-string extended from said wire upward in the longer stem and thence downward through the shorter stem, and a roller at the junction of the two stems, over which said cord passes, substantially as specified.

6. A boutonnière, comprising a body portion, two stems having removable connection with the body portion, the said stems being tubular and of different lengths, a device movable into and out of the body portion, a flexible wire forming a bill for said device and extended into the longer stem, an elastic connection between the lower end of said wire and the lower portion of the longer stem, a draw-string extended from said wire upward in the longer stem and thence downward through the shorter stem, a roller at the junction of the two stems, over which said cord passes, and means for causing wings on the movable device to flutter as it is moved inward and outward, substantially as specified.

In testimony whereof I have signed my name to this specification in the presence of two subscribing witnesses.

THOMAS LEANDER McCORMACK.

Witnesses:
WALKER COLEMAN,
G. W. HUNNICUTT.